Figure 6:
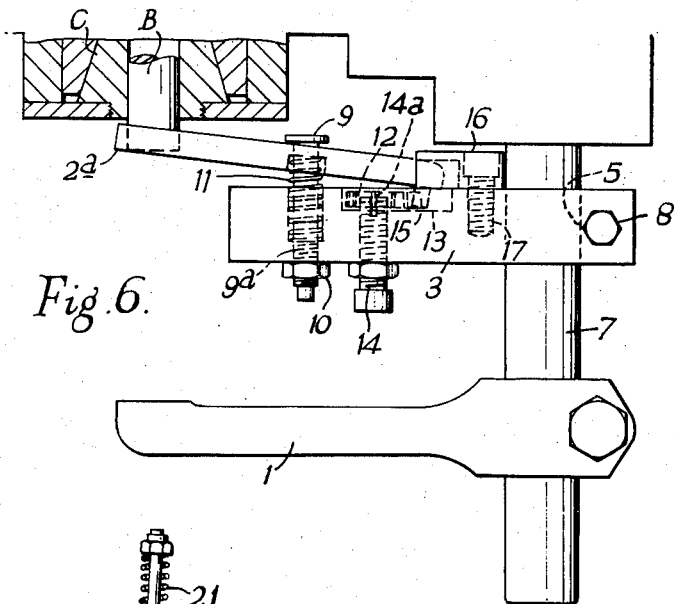

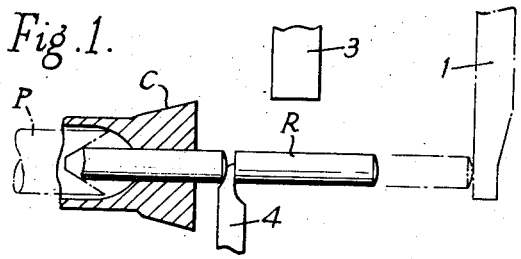
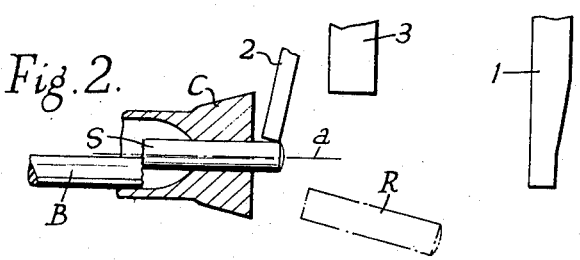
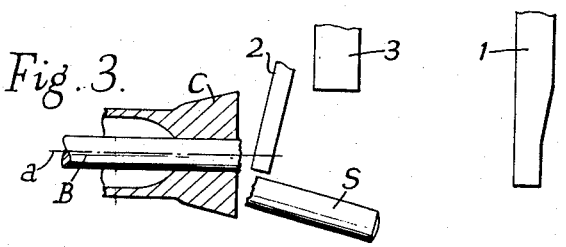
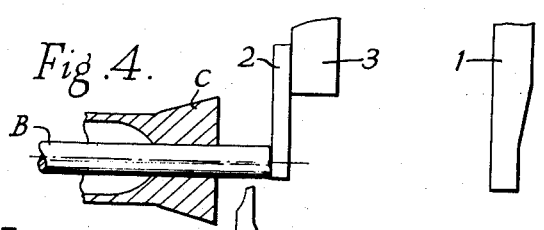
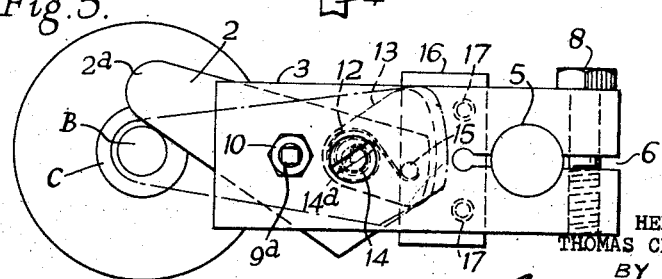
INVENTORS
HENRY EDWIN VANN
THOMAS CHARLES KEELING

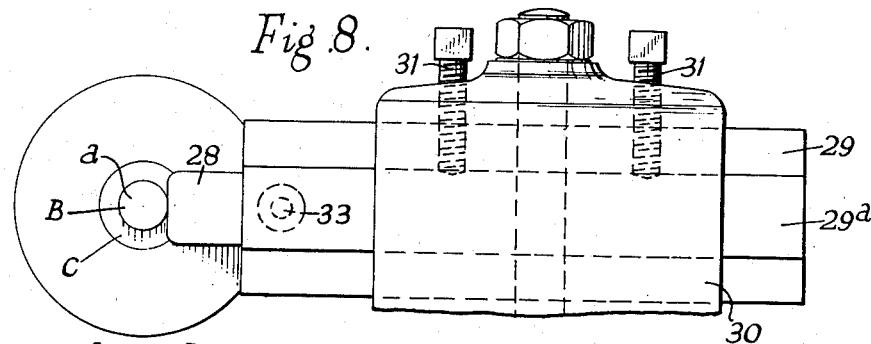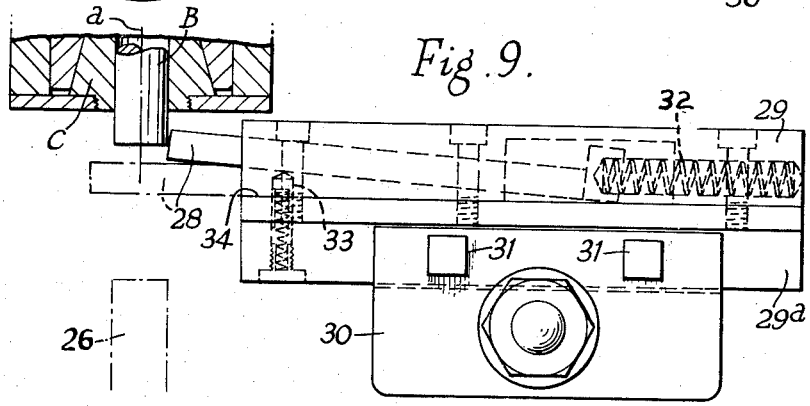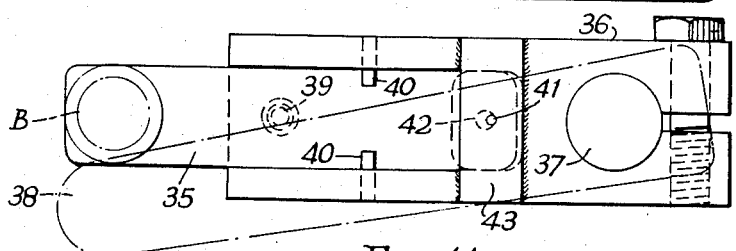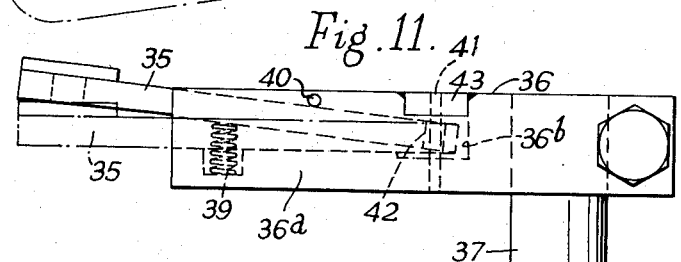

United States Patent Office 3,095,771
Patented July 2, 1963

3,095,771
STOP DEVICES FOR FACILITATING AUTOMATIC FEEDING OF BAR STOCK INTO MACHINE TOOLS
Henry E. Vann, Leicester, and Thomas C. Keeling, Birstall, Leicester, England, assignors to Ratby Engineering Company Limited, Earl Shilton, Leicestershire, England, a company of Great Britain
Filed May 14, 1958, Ser. No. 735,256
Claims priority, application Great Britain May 15, 1957
8 Claims. (Cl. 82—34)

This invention appertains to stop devices for facilitating automatic feeding of bar stock through the collets of machine tools and the like such, for instance, as automatic lathes, screw automatics, cutting off machines, centreless grinders, and so on.

Thus, the stop devices of this invention are advantageously applicable to any automatic machine which is adapted to have fed into it. e.g. by a bar feed, bar or rod stock for conversion by the said machine into successively produced components.

A "bar feed" may be constituted by an apparatus comprising a stand upon which is mounted a long and horizontally disposed tube, channel or equivalent adapted to receive and support a length of bar stock, a pusher element which is slidable axially within the tube, channel or equivalent and is arranged to act upon the appropriate end of the supported bar stock, and means for imparting to the pusher element in the appropriate direction a driving force sufficient for pressing upon the said end of the bar stock and pushing the latter forward for the purpose of feeding it into a machine tool—through a collet, vice jaws or a gripping mechanism (hereinafter for convenience referred to generically as a "collet").

An automatic machine or machine tool adapted to have bar stock fed into it must perforce have associated or combined therewith an operable stop which is movable into an operative position, once per cycle, to locate the forward end of and arrest, a bar fed through the opened collet. That is to say, this stop limits the outward feed of a bar each time it is moved forwards through the open collet and accurately locates the bar preparatory to the next closure of the said collet. The stop is so timed that it moves into its operative position immediately after each successive work component has been parted-off from the bar stock by means of a parting-off tool located at the side or end of the collet remote from the bar feed.

Sometimes the said stop is constituted by a member which is rigidly secured upon an oscillatory spindle and is conventionally known as a "swing stop." But on an automatic machine equipped with a turret, a turret stop may be used in lieu of a swing stop. Or any other appropriate type of independent stop, i.e. a stop separate from the machine, may be employed to limit the outward feed or "feed out" of bar stock.

For the sake of convenience and to facilitate an understanding of the present invention, the stop already referred to, of whatever form, will be hereinafter regarded as the "normal stop."

Now after a relevant number of feed outs of a length of bar stock from a bar feed into a machine tool, resulting in the production of a corresponding number of work components, there remains a remnant of stock which is usually insufficently long to reach the normal stop during the next feed out. With the collet closed, the outer end of the remnant is, however, a parted-off, and a fresh length of bar stock is meanwhile fed up to the back of the collet—immediately behind the short inner portion of the remnant known as a "slug." Then, with the collet open again, the fresh length of bar stock is fed forwards through the collet and thereby ejects the slug therefrom. But when the ejected slug has fallen away clear of the collet, the outer end of the fresh length of bar stock requires to be trued up before the first of the fresh series of work components can be produced. This truing up has heretofore been effected by one of two procedures. According to the first, which permits of uninterrupted automatic feeding, the fed out bar stock which ejects the slug is permitted to move right up to the normal stop and the first parting-off operation is relied on to true up the fresh stock. In this case, however, the fairly long portion of stock extending between the parting-off tool and the normal stop is unsuitable for forming into a work component because its outer extremity is untrued. Consequently, the first portions to be parted-off from successive lengths of bar stock are wasted. In the second procedure complete automaticity of the bar feed is sacrificed in the interests of avoiding this waste. Thus, according to this second procedure, after a fresh length of bar stock has been placed on the tube, channel or equivalent and fed up to the back of the collet, the latter is opened, the slug is removed therefrom manually, and the fresh bar is advanced through the collet by hand with the aid of a hand wheel or like control. Then, as the appropriate end of the hand-fed fresh bar protrudes to a relevant small extent only through the collet, the latter is closed and the protruding end is trued up by the parting-off tool—without any significant waste. At this stage, and with the collet open again, the already trued up bar is fed out to the normal stop and the cycle proceeds automatically. Naturally, however, the temporary hand feeding of each fresh length of bar stock preparatory to truing up of the same interrupts the production of work components.

The object of the present invention is to provide, in or for an automatic machine tool required to be fed with bar stock by a bar feed, a device in the form of an auxiliary stop which is constructed and operable suchwise as to enable the leading ends of fresh lengths of bar stock to be trued up, without any significant wastage and without interrupting production of work components.

Accordingly, the stop device of this invention enables what would normally be a semi-automatic bar feed to be used in a wholly automatic manner.

The auxiliary device constituting this invention includes a blade or the like which is mounted, or adapted to be mounted, on the mchine tool adjacent to the collet thereof, the said blade being not only biased radially with reference to, and in the direction of, the collet axis and movable to and fro in this direction by means operable in timed relation with the machine tool and a bar feed used in conjunction therewith, but being also constrained normally to assume a position close to the collet face, i.e. at the collet side of the parting-off tool, and yet being displaceable laterally against the action of the constraining influence and along the collet axis up to an abutment which locates the stop at the opposite side of, but near to, the said tool.

With the machine tool and the bar feed in operation the auxiliary stop blade is moved radially towards the collet axis each time the normal stop is rendered operative and positioned in axial alignment with the collet to limit an out feed of bar stock. Conversely, the said blade is moved radially away from and clear of the collet each time the normal stop is displaced to an inoperative position.

FIGURES 1–4 are diagrammatic illustrations of the operation of the auxiliary stop device of this invention.

Figure 7:
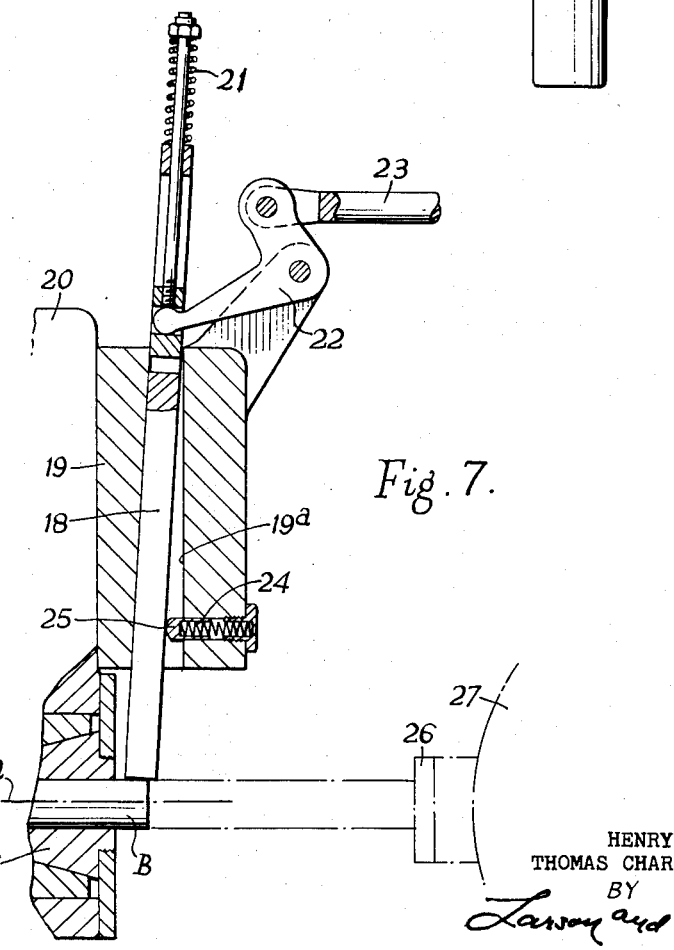

FIGURE 5 is a side view of one form of the auxiliary spring swing stop and associated abutment component provided in accordance with the invention, FIGURE 6 is a plan view of the said auxiliary spring swing stop shown in relation to a collet, a swing stop spindle and a normal swing stop, FIGURE 7 is a vertical sectional view of an alternative form of the auxiliary stop applied to a machine having no swing stop spindle, FIGURES 8 and 9 are side elevational and plan views similar to FIGURES 5 and 6, respectively depicting a form of the invention in which the auxiliary stop blade is mounted in a body adapted to be secured in a rear tool post of an automatic machine, and FIGURES 10 and 11 are side and plan views of a still further form of the invention hereinafter to be described.

The operation of the auxiliary stop device of this invention, considered broadly will now be described with reference to FIGURES 1-4 of the accompanying drawings which figures illustrate, in purely diagrammatic fashion, a collet C, a normal stop 1, an auxiliary stop blade 2 and an associated abutment 3, and a parting-off tool 4.

When a length of bar stock is being normally fed into the machine by a bar feed, then each time the normal stop 1 is rendered operative, the auxiliary stop blade 2, located close to the face of the collet C, will be automatically moved radially inwards towards the collet axis $a$ and into contact with the peripheral surface of the bar stock extending through the collet. As it contacts the bar stock the blade 2 will yield against the radial biassing influence and there remain quiescent (pressed against the stock) until the normal stop 1 is next rendered inoperative at which time the auxiliary stop blade 2 will move radially away from the feeding bar stock. In short, whilst and for as long as a length of bar stock is being fed into the machine a step at a time, the auxiliary stop blade 2 is merely moved to and fro idly. But when the length of bar stock has been wholly cut up into work components, and at the precise instant (with the normal stop 1 operative) when a fresh length of stock B, advancing through the collet C, ejects the "slug" or stub S of the previous bar, the auxiliary stop blade 2 is released for movement under the radial biassing influence as a consequence of which it rapidly pushes aside the slug S and, in passing over the opposing face of the collet C, takes up an operative position in front of the latter all as illustrated in FIGURE 3. The still advancing fresh bar stock B therefore acts on the blade 2 and presses it laterally against the constraining influence and along the collet axis $a$ until it is arrested by the abutment 3 (see FIGURE 4). At this stage in the cycle, the auxiliary stop blade 2 limits the advance of the bar stock B and, with the collet C closed, then retires simultaneously with withdrawal of the normal stop 1 from its operative position. The parting-off tool, indicated at 4 and now spaced axially only a very short distance from the forward extremity of the bar stock B, trues up the latter, whereupon the collet C is opened to enable the feed out of the stock to be resumed. The normal stop 1 is at that instant rendered operative again, the auxiliary stop blade moving radially inwards but now, of course, only idly into yieldable contact with the fed out stock B.

FIGURES 1-4 will now be described in greater detail. In FIGURE 1 are represented the conditions which obtain when the bar feed plunger P (indicated in chain lines at its fully advanced position) has just returned to pick up a new bar. The remnant R of the old bar has been fed out and as will be seen is insufficiently long to reach the normal stop 1. This is because stock bars are of random lengths. To feed out the remnant R to the position shown it is necessary for the plunger P to advance until its leading end contacts the shoulder of the collet C.

The parting-off tool 4, since it operates entirely automatically, functions to divide the waste remnant R into two portions, viz. an outer portion which immediately falls away as indicated in chain lines in FIGURE 2 and an inner portion in the nature of a "slug" or stub which remains gripped in the collet C.

In FIGURE 2 both the normal stop 1 and the auxiliary stop blade 2 have moved into their operative positions, the blade 2 being prevented from dropping in front of the collet opening by the presence of the slug or stub S which at this stage is still gripped in the collet C. The blade 2 is, however, subject to a downward spring pressure, and the new bar B is pushing against the rear end of the slug or stub S.

The collet C then opens with the result shown in FIGURE 3. That is to say, the new bar B, in being pushed through the collet, dislodges the slug or stub S which as it emerges from the collet is immediately pushed aside by the released auxiliary stop blade 2 as this, under the appropriate spring action, positions itself in front of the advancing new bar B.

In FIGURE 4, the blade 2 is shown as it appears after having been pushed laterally up to the abutment 3 by the advancing new bar B (shown with a ragged end). Immediately following the stage depicted in FIGURE 4, the collet C closes again, the stops 1 and 2 retire and the parting-off tool 4 advances and trues up the leading end of the new bar with a minimum waste of bar stock. In this way, the production of a scrap component (waste by virtue of a ragged end) is avoided.

In a case where a machine tool is equipped with a normal stop of the swing type which is rigidly secured upon an auxiliary spindle as hereinbefore described, the auxiliary stop blade may advantageously be mounted upon a component which constitutes the abutment and is clamped upon the said spindle at a location nearer to the collet than the said normal stop. Such a component accordingly partakes of the swinging movements of the normal stop and transmits these movements to the auxiliary stop blade for the purpose of moving the latter radially towards and away from the collet axis.

In a convenient embodiment of the invention, the abutment component may consist of a flat-sided lever, and the auxiliary stop blade, suitably controlled by springs, may be mounted to turn about, and be laterally displaceable axially with respect to, a pivot pin set in the component. In this embodiment, a torsion spring may advantageously be provided to control the turning, i.e. swinging, movements of the auxiliary stop blade relatively to the abutment component, whilst compression spring means interposed between the two may be relied on normally to hold the blade close to the collet face. Thus, whenever the auxiliary stop blade is permitted to swing into its operative position, and a fresh length of bar stock is fed forwards through the collet, then the leading extremity of the stock will act upon the opposing side of the blade and press it laterally against the action of the compression spring means, into contact with the abutment component. As will be appreciated, although the abutment component partakes of the swinging movements of the normal stop, it is immovable axially, that is to say along the collet axis.

To enable the invention to be more clearly understood and readily carried into practical effect, specific constructional examples thereof will now be described with reference to FIGURES 5-11 of the accompanying drawings, wherein, Referring to FIGURES 5 and 6 it will be seen that the abutment component 3 is in the form of a lever consisting of a rectangular block which is bored through transversely at 5 near to its rear end and is split longitudinally at 6 adjacent to the bore suchwise as to enable it to be clamped upon the oscillatory spindle 7 of a normal swing stop 1 (FIGURE 6). A screw 8, passed transversely through the longitudinally split rear end of the lever 3, is provided to clamp the latter in position. The auxiliary stop blade 2 in this example is substantially thinner than the lever 3 and is of generally tapering form. At its operative end the stop blade 2 may, if desired, although this is not shown, have formed therein a semi-circular recess to enable it to engage over, without damaging, bar stock of a section other than circular, e.g. hexagonal or square. Since in this case more than one protuberant edge of the stock at a time would be contacted by the blade, the latter would be prevented from hammering the stock. Substantially midway between its ends, the blade 2 is drilled to receive a suitably headed pivot pin 9 the inner portion 9a of which is screw-threaded and screwed into a correspondingly tapped hole formed in the abutment lever 3. The screw threaded portion 9a of the pivot pin 9 protrudes from the lever for co-operation with a locknut 10. The blade 2 is, therefore, pivotally mounted at the side of the lever 3 opposing the machine collet C, and the length of the pivot pin 9 is such as to permit of a limited degree of lateral movement of the blade in relation to the said lever. A compression spring 11, surrounding the pin 9, is interposed between the blade 2 and the lever 3, this spring serving normally to urge the rounded nose 2a of the blade into a position close to the face of the collet C. The pivot pin 9 is adjustable to determine the precise amount of the permitted lateral movement of the blade 2. The said blade is also influenced by a torsion spring 12 which is accommodated in a recess 13 formed in the side of the lever 3 opposing the blade 2, the inner end of the spring being engaged in a diametral slot 14a formed in the leading end of an adjustable spring-adjusting screw 14 engaged in a further tapped hole in the lever. The outer end of the torsion spring 12 is arranged to bear upon a pin 15 which extends laterally from the rear end of the blade 2 into the recess 13. The torsion spring 12, moreover, is so adjusted as to constrain the blade 2 to normally take up (whenever permitted to do so) a position coincident with the median line of the lever 3 as indicated in chain lines in FIGURE 5. The blade may, however, take up any other appropriate radial position clear of tools and slides on the machine tool.

In this particular example, the auxiliary stop blade 2 fulcrums about its rear edge when the operative nose 2a is moved aside laterally away from or towards the associated lever 3. Thus, the blade, in addition to being pivoted for turning movement radially, is also arranged for limited swinging movement laterally. A suitably recessed retainer block 16, attached to the appropriate side of the lever 3 by means of screws such as 17, is arranged to accommodate the rear end of the blade 2 and to provide the fulcrum therefor. Whenever the blade is pressed aside laterally against the action of the compression spring 11, the flat side of the blade 2 remote from the collet C is moved into contact with the flat opposing side of the lever 3, the blade being maintained in this position (in which it functions as an auxiliary stop) by the reaction of the retainer block 16.

Instead of being associated with a normal stop of the swing type, the auxiliary stop device of this invention may be independent of the normal stop in which instance it may be operated remotely, e.g. from the cam shaft of the automatic machine. According to this alternative, there would be no necessity for the auxiliary stop blade to swing: instead, it could be arranged for linear reciprocation radially with respect to the collet axis, under the control of a compression spring.

A specific constructional example of this alternative is illustrated in FIGURE 7. As will be seen, the auxiliary stop blade 18 is mounted for movement longitudinally within a stationary body 19 which is fixed to the headstock 20 or other appropriate fixed part of the automatic machine. A compression spring 21 arranged as shown controls linear reciprocation of the blade 18 with respect to the collet axis a.

Intermediate connections of any suitable character, for instance connections including a bell crank 22 and a link 23, may be provided for reciprocating the blade 18 from the aforementioned cam shaft. As for lateral displacement of the blade 18, the body 19 can be formed to permit pivotal displacement of the blade 18 as shown in FIGURE 7, or can be formed to permit lateral shifting of the blade 18 between parallel positions under the control of one or more compression springs such as the single spring 24 which influences a plunger 25 arranged to contact the blade 18. In this embodiment the abutment is constituted by the inner portion 19a of the stationary body 19. Merely for convenience in illustration, the auxiliary stop blade 18 is shown working in conjunction with a normal stop 26 in the turret 27 of the machine.

In the further example of the invention illustrated in FIGURES 8 and 9, wherein the auxiliary stop blade 28, as in the previous example, functions in conjunction with a normal stop 26 in a turret, the said blade is mounted in a body 29 which is adapted to be secured in a rear tool post 30 cammed to traverse fore and aft in timed relation with the normal stop cycle. Thus, the body 29 is, in this example, formed with a tongue 29a which is held in the tool post 30 by clamping screws 31. The stop blade 28 is biassed radially with reference to, and in the direction of, the collet axis a by means of a compression spring 32 accommodated within the body 29 as shown in FIGURE 9. As in the previous example illustrated in FIGURE 7, the blade 28 is normally constrained by a spring-influenced plunger 33 to assume a position close to the face of the collet C; the blade is, however, displaceable laterally against the action of this plunger and along the collet axis a up to a face 34 in the body 29 constituting the abutment.

Finally, in the example depicted in FIGURES 10 and 11, the auxiliary stop blade 35 is mounted in a body 36 which is adapted to be rigidly clamped upon the spindle 37 of a normal stop 38 of the swing type. A spring (not shown) controlling the conventional swing stop spindle 37 is relied on, in this example, to bias the blade 35 radially with reference to, and in the direction of, the collet axis. The stop blade 35 and the normal swing stop 38 thus always move together. For this reason it is, of course, necessary that the two stops shall be displaced angularly with respect to one another by the extent of approximately the diameter of the bar stock B being operated upon (see FIGURE 10). Accordingly, whenever the normal stop 38 is operative, in alignment with the collet axis, the lower edge of the auxiliary stop blade 35 will be yieldingly in contact with the top side of the bar being fed.

When, however, upon ejection of a slug or stub from the collet the auxiliary stop blade 35 is released and swings down into its operative position shown in FIGURE 10, the normal stop 38 will be positioned below the new bar—as indicated in chain lines in this figure. A compression spring 39 constrains the blade 35 normally to assume a position close to the collet face and, when displaced laterally against the action of this spring, the said blade moves up to an abutment constituted by a portion 36a of the body 36. A pair of opposed pins 40 set in the body 36 serve to limit the extent of the outward deflection of the blade 35 imparted by the spring 39. A transverse pin 41 secured in the said body extends laterally through an over-size hole 42 formed in the tail end of the blade 33, the latter being accommodated within a rabbet 36b formed in the body. An insert 43 set in the body provides the reaction necessary to maintain the blade 35 against the abutment face at appropriate times.

We claim:

1. In apparatus for cutting lengths of bar stock from sections thereof including a collet through which the sections are fed, means for limiting outward feed of each section from the outlet end of the collet along its axis, and means movable in a plane traversing the collet axis between said outlet end and said limiting means to cut the section at a predetermined length from the limiting means, means for forming the forward end of each section comprising an interceptor member, retractable means for movably mounting the interceptor member in a first plane traversing the collet axis between the cutting traverse plane and said limiting means including first resilient means urging the interceptor member to traverse the collet axis, second resilient means urging the interceptor member toward said outlet end of the collet and into a second plane traversing the collet axis between said outlet end and said cutting traverse plane, and abutment means disposed between said cutting traverse plane and said limiting means to restrict lateral movement of the interceptor member against the action of the second resilient means to the space defined between said first and second traverse planes thereof whereby said member intercepts the forward end of each section and stations it in said space for forming by said cutting means.

2. Apparatus according to claim 1 further comprising means for retracting the limiting means relative to the collet axis.

3. Apparatus according to claim 1 further comprising means for simultaneously retracting the limiting means and the means for movably mounting the interceptor member, relative to the collet axis.

4. Apparatus according to claim 3 wherein said last-named means comprises a rotatable shaft on which the limiting means and the means for movably mounting the interceptor member are fixed for movement relative to the collet axis.

5. Apparatus according to claim 3 wherein the means for movably mounting the interceptor member are secured to the abutment means and said last-named means comprises a rotatable shaft on which the limiting means and the abutment means are fixed for movement relative to the collet axis.

6. Apparatus according to claim 1 wherein the interceptor member is mounted on the abutment means for pivotal movement relative to the collet axis and lateral movement relative to the abutment means.

7. Apparatus according to claim 1 wherein the interceptor member is mounted on the abutment means for reciprocal movement relative to the collet axis and lateral movement relative to the abutment means.

8. Apparatus according to claim 7 further comprising means engageable with the interceptor member to retract it relative to the collet axis.

References Cited in the file of this patent

UNITED STATES PATENTS

| | | |
|---|---|---|
| 445,294 | Treat | Jan. 27, 1891 |
| 751,121 | Tidey | Feb. 2, 1904 |
| 804,109 | Evans | Nov. 7, 1905 |
| 1,814,586 | Crosby | July 14, 1931 |
| 1,823,501 | Messinger | Sept. 15, 1931 |
| 2,245,732 | Stull | June 17, 1941 |
| 2,431,528 | Wells | Nov. 25, 1947 |
| 2,920,376 | Lakins | Jan. 12, 1960 |

FOREIGN PATENTS

| | | |
|---|---|---|
| 851,447 | Germany | Oct. 6, 1952 |